United States Patent Office 3,408,363
Patented Oct. 29, 1968

3,408,363
PRODUCTION OF DIOXOLANES
Walter H. Brader, Jr., Austin, Tex., assignor to Jefferson Chemical Company, Inc., Houston, Tex., a corporation of Delaware
No Drawing. Filed Dec. 27, 1965, Ser. No. 516,776
6 Claims. (Cl. 260—340.9)

ABSTRACT OF THE DISCLOSURE 1,3-dioxolane is produced by contacting a lower 1,2-glycol with a metal phosphate salt catalyst containing in the cationic portion an alkali metal and from one to about four mols of trivalent metal per mol of alkali metal. The trivalent metal is selected from aluminum, boron, bismuth or iron.

---

This invention relates to a method for the production of 1,3-dioxolanes. More particularly, this invention relates to an improved method for the production of 1,3-dioxolanes by the catalytic cyclization of glycols.

1,3-dioxolanes are cyclic acetals which are useful as solvents and as chemical intermediates in the preparation of polymers and peroxides. The conventional synthesis of 1,3-dioxolanes is shown in the following equation:

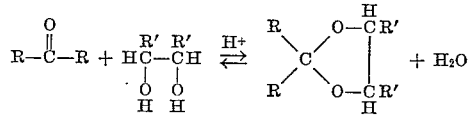

It will be seen that in accordance with this reaction a glycol is reacted with a carbonyl compound. The reaction involves the equilibrium shown and in order to get good conversions, water must be removed from the system in order to shift the equilibrium to the right. Removal of water from such a system is both difficult and time consuming and has made it impractical to provide for 1,3-dioxolanes in large quantities.

Obolentzev et al. have suggested the use of silica-alumina for the conversion of ethylene glycol to 2-methyl-1,3-dioxolane (Obolentzev, R. D. and Gryazev, N. N., Doklady Akad. Nauk S.S.S.R. 73, page 319, 1950; Chem. Abstracts 44, p. 9916d, 1950). However, the synthesis suggested by Obolentzev et al. has only a poor selectivity to dioxolanes.

In contrast to the foregoing, it has now been surprisingly discovered in accordance with the present invention that high yields of 1,3-dioxolanes are obtained when a glycol is cyclized in the presence of a metal phosphate catalyst as defined herein. The reaction is illustrated by the following equation:

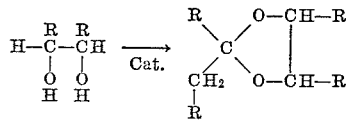

In the formula, R is selected from the group consisting of hydrogen, methyl and ethyl.

The catalysts to be used in accordance with the present invention are complex phosphates (orthophosphates, pyrophosphates, etc.) containing in their crystalline structure an alkali metal and preferably, a trivalent metal such as aluminum, boron, bismuth and iron. The alkali metal may suitably be sodium, potassium, lithium, rubidium or cesium. Thus, the catalyst may suitably contain about 0 to 4 mols of trivalent metal per mol of alkali metal and, more preferably, about 0.5 to 4 mols of trivalent metal per mol of alkali metal. The catalysts and their method of preparation are shown in greater detail in my copending application Serial No. 396,792 filed Aug. 31, 1964, now Patent No. 3,342,820, and entitled "Synthesis of Substituted Heterocyclic Diamines and Catalysts Therefor."

The chemical identity of the phosphate will have a bearing on the optimum ratio of alkali metal to the trivalent metal to be used in the above-mentioned range. Thus, with potassium orthophosphates, it is preferable to employ from about two to about four mols of trivalent metal per mol of alkali metal. With a pyrophosphate it is preferable to employ from about 0.5 to 2 mols of trivalent metal per mol of alkali metal.

For best results the catalyst composition should be composed of essentially amorphous phosphate having a maximum crystallite diameter of not more than about 200 angstrom units.

The preferred catalysts to be used in accordance with the present invention include sodium aluminum orthophosphate, potassium ferric orthophosphate, potassium ferric pyrophosphate and lithium potassium phosphate.

The glycols to be used in accordance with the present invention are the lower glycols such as ethylene glycol, propylene glycol, butylene glycols, etc.

The process of the present invention is preferably conducted at a temperature within the range of about 200° to about 400° C. and more preferably within the range of about 250° to about 300° C. The reaction is preferably conducted at atmospheric pressure, although superatmospheric pressures up to about 10 atmospheres may be employed if desired. Space velocities are preferably within the range from about one to two grams of feed per cc. of catalyst per hour.

The invention will be further illustrated with respect to the following examples which are given by way of illustration and not as limitations on the scope of this invention. The parts mentioned are parts by weight.

Example I

Ethylene glycol was continuously pumped into a reactor of 200 ml. volume which contained 50 ml. of an 86% silica-12% alumina catalyst. The reactor effluent was condensed in a three-necked flask immersed in a Dry Ice-acetone bath and to which was attached a Dry Ice-acetone condenser. The reactor conditions were: 290° C., one atmosphere pressure, an ethylene glycol feed rate of 1.34 g./cc. catalyst/hour. The product was fractionated and the fractions analyzed by vapor phase chromatography. The product analyzed as follows:

Ethylene glycol conversion, percent _____ 56
Acetaldehyde yield, mol percent _____ 14
2-methyl-1,3-dioxolane, mol percent _____ 24

Example II

In a manner similar to that in Example I, ethylene glycol was converted over a sodium-containing aluminum phosphate catalyst which contained less than one mol of sodium per mol of aluminum. The reaction conditions were: 310° C., one atmosphere pressure and an ethylene glycol flow rate of 2.2 g./cc. catalyst/hour. The results were as follows:

Ethylene glycol conversion, percent _____ 92
Acetaldehyde yield, mol percent _____ 4
2-methyl-1,3-dioxolane yield, mol percent _____ 60
Dioxane yield, mol percent _____ 16

The results in two examples shown above illustrate how yields of a 1,3-dioxolane can be improved by use of a catalyst of the present invention.

Example III

When propylene glycol is substituted for ethylene glycol and Example II is otherwise conducted in the above-described manner, equivalent results are obtained.

Having thus described my invention, what is claimed is:

1. A method for the preparation of a 1,3-dioxolane which comprises the steps of contacting a lower 1,2-glycol with a metal phosphate catalyst containing in the cationic portion thereof an alkali metal selected from sodium, potassium, lithium, rubidium, or cesium or from one to about four mols per mol of alkali metal of a trivalent metal selected from the group consisting of aluminum, boron, bismuth and iron.

2. A method as in claim 1 wherein the metal phosphate catalyst has a crystalline structure wherein the crystallites have a maximum diameter of not more than about 200 angstrom units.

3. A method as in claim 2 wherein the reaction conditions include a temperature within the range of about 200° to about 400° C., a pressure within the range of about one to about 10 atmospheres and a space velocity of about 0.5 to about 5 pounds of feed per hour per pound of catalyst.

4. A method as in claim 3 wherein the glycol is selected from a group consisting of ethylene glycol, propylene glycol and butylene glycol.

5. A method as in claim 4 wherein the glycol is ethylene glycol and wherein the phosphate catalyst is sodium aluminum phosphate catalyst.

6. A method as in claim 4 wherein the glycol is propylene glycol and the catalyst is sodium aluminum phosphate catalyst.

References Cited

UNITED STATES PATENTS 3,342,820   9/1967   Brader _____ 260—268

NICHOLAS S. RIZZO, *Primary Examiner.*

JAMES H. TURNIPSEED, *Assistant Examiner.*